UNITED STATES PATENT OFFICE.

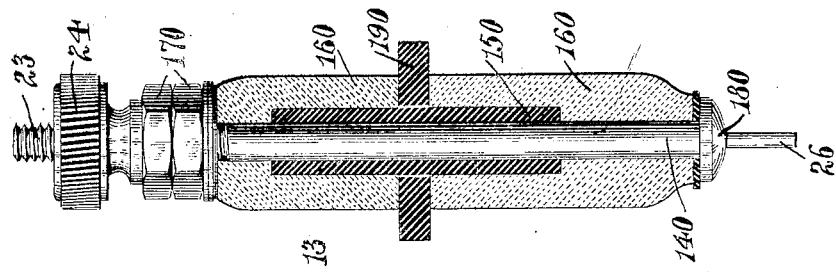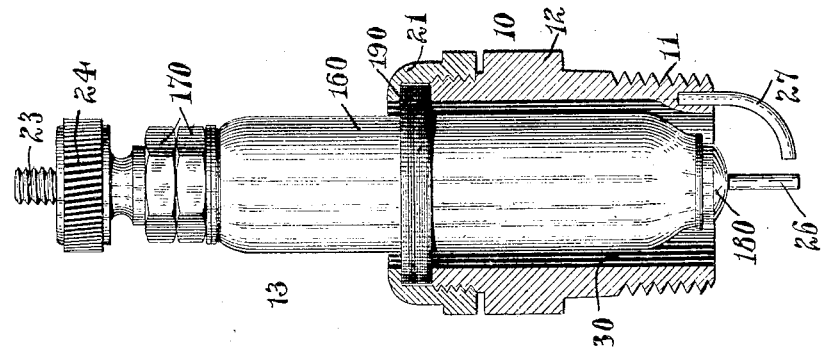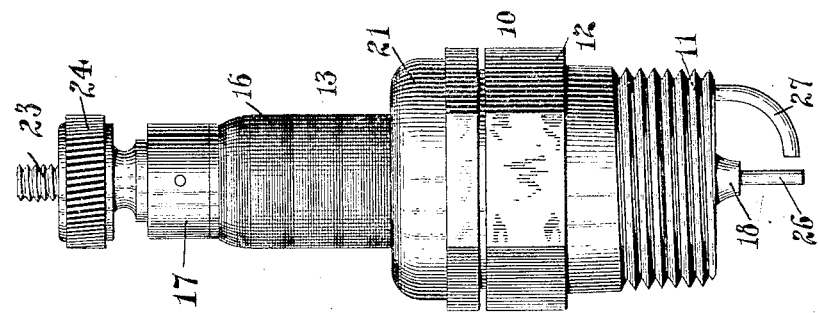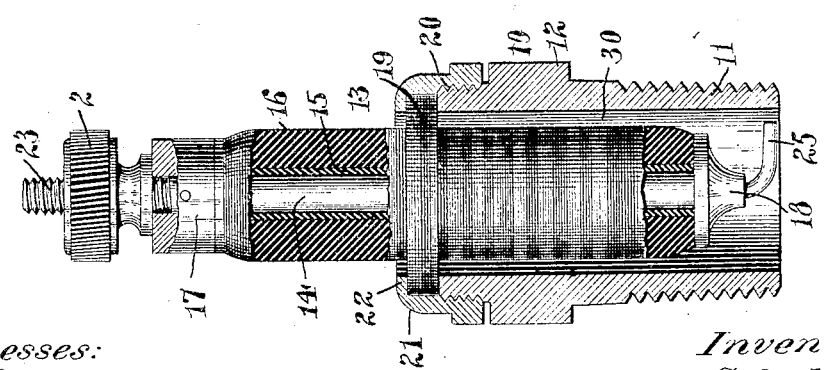

GEORGE J. SCHULTZ, OF NEW YORK, N. Y., ASSIGNOR TO BENJAMIN BRISCOE, OF TARRYTOWN, NEW YORK.

IGNITER.

No. 877,130.　　　Specification of Letters Patent.　　　Patented Jan. 21, 1908.

Application filed January 24, 1907. Serial No. 353,770.

*To all whom it may concern:*

Be it known that I, GEORGE J. SCHULTZ, a citizen of the United States, residing in the borough of Brooklyn, New York city, in the county of Kings and State of New York, have invented certain new and useful Improvements in Igniters, of which the following is a specification.

This invention relates to and has for an object to provide an improved igniter or spark plug for use particularly in internal combustion engines, and has for an object to provide a device of this character which is not only highly effective, but which will permit an observer from the outside to ascertain whether or not the proper sparks are being given off from the sparking points, and explosions are taking place within the explosion chamber to which the igniter is applied.

In internal combustion engines there has been considerable difficulty experienced, particularly in an engine having several cylinders, of locating the spark plug difficulties and finding out which of the cylinders is not working properly. It frequently happens that one of the igniters will become clogged up with soot or its circuit interrupted, and the operator, although aware of the fact that explosions are not occurring in one of the cylinders, cannot tell in just which cylinder the difficulty exists; and it is to furnish means for ascertaining this that the present improvement has been constructed.

In its preferred form this invention will embody a casing or plug in the nature of a bushing to be screwed into the explosion chamber and having an opening through it, and a body of insulating material, carrying at least one of the sparking points, of appreciably less diameter than the inside diameter of the casing, will carry a collar or flange of some translucent material, mica for example. The collar or flange will be clamped into position, preferably by being clamped against the casing by a screw collar, for instance. The translucency of this collar will enable the operator to observe whether or not proper sparks are being given off, and whether explosions are regularly taking place within the explosion chamber. This will enable him not only to tell whether the igniter is giving out sparks at proper intervals and at proper timing relative to the positions of the pistons, but also whether the sparks are effective to cause explosions in the chamber. If it is found that there are no sparks it may then be believed that the difficulty exists either in the fouling of the points or some difficulty within the circuit. If, however, it is found that sparks are being given out and no explosions occur it will be known that the trouble should be sought for in the fuel or its supply, being either too rich or too poor to support combustion or explosions; or in some instances the feed pipes of one or more cylinders or explosion chambers may become clogged or damaged. Much time can be saved by knowing whether the trouble is at the igniter or arises from some other source; and if the sparks are not being given off at the proper time this may be remedied by advancing or retarding the spark as conditions indicate.

In the drawings accompanying and forming a part of this specification Figure 1 is a view partly in longitudinal section and partly in side view of a practicable form of my present improvement. Fig. 2 is a side view of the device illustrated in Fig. 1 with the exception that the contacts or points are differently arranged. Fig. 3 is an illustration of another form of my improvement; in this instance the casing or plug for connection to the explosion chamber is shown in longitudinal section and the insulator portion is shown in side view; and Fig. 4 is an illustration partly in longitudinal section and partly in side view of the form of insulator illustrated in Fig. 3 detached from the casing.

In the present drawings I have shown two styles of construction, that is, one represents what is known as the mica spark plug, and the other represents the combined mica and porcelain plug. Having reference now to Fig. 1, a casing or plug 10 is illustrated in the form of a bushing, which is intended for connection to an ignition or explosion chamber, as for instance, the explosion chamber or cylinder of an internal combustion engine, and may be connected thereto by means of a screw threaded end 11 which will pass through a suitable screw threaded opening in the wall of such chamber. The casing is provided with a central bore, and may have a nut or wrench engaging portion 12. Arranged partly within and partly without the casing is an insulator, designated in a general way by 13, which carries a body of conducting material shown in the form of a shaft portion 14 having upon it an insulation sleeve 15, which may be of sheet mica wound around the shaft, and outside of the sleeve 15 is arranged another insulation body 16, which may be a series of disks closely fitting the sleeve 15 and pressed together by means of heads 17 and 18. The mica disks will be turned down to the proper size so that the portion which is within the bore of the casing will be of appreciably less radius than the radius of the casing, thus leaving an annular space between the casing and the perimeter of the insulation. The disks at the portion 19 may be made of considerably larger radius for a short distance, and being made of translucent material, mica for instance, will permit the passage of rays of light from sparks and explosions. In assembling the device the portion 19 of the enlarged disks will be placed upon the outer end of the casing, which end may be externally screw-threaded, as at 20, for receiving a screw threaded cap 21, which will have an overhanging portion 22 for engaging this collar or flange of the large disks and pressing them tightly together, and against the end portion of the casing, thus making a secure closure and one which will be sufficiently translucent to admit the observation of light within the chamber to which the igniter is applied, which light may either be from sparks of explosions, or both. The shaft 14 is shown extended, as at 23, and screw threaded for receiving a binding screw 24 for the attachment of one of the electric wires. The head 18 or the end of the shaft 14 will carry the spark point 25, which in the present instance is shown bent over toward the casing 10 which will form the other circuit terminal.

The structure shown in Fig. 2 differs from that shown in Fig. 1 in that the spark point 26 is beyond the end of the casing and is straight and will coöperate with a point 27 which is carried by the casing and is bent over the proper distance.

The device shown in Figs. 3 and 4 differs from that shown in Fig. 1 in that the shaft 140 has upon it a shorter insulation sleeve 150 over which is carried a pair of insulation devices 160, which may be made of porcelain and clamped together by means of a head 180 and a pair of set nuts 170, and between the ends of which, and overlying the sleeve 150, will be a collar or flange 190 of some translucent insulating material, as for instance, mica, and this may be set up in a similar casing to those shown in Figs. 1 and 2, in the present instance it being shown in connection with spark points such as are illustrated in Fig. 2, and to which casing and points like reference characters have been added.

It will be seen that when it is desired to apply the device which has been assembled in the manner described, the screw threaded portion 11 will be screwed into the proper screw threaded opening in the casing of the chamber to which it is to be applied, and then by looking through the flange or collar of translucent material the operation of the spark may be observed. The spark can be seen to flash and the explosion of the gases to follow it. If it is found that the sparks are not being given off properly it will simply be necessary to unscrew the cap 21, remove the insulator 13, clean the points and replace the device. If the sparks are seen to be given off regularly but no flash from the explosion is seen then the trouble must be looked for at some point other than the igniter, and will often obviate the removal of the igniter for finding out if it is really working. The space 30 between the insulator and the casing not only serves to convey the rays to the translucent plate but also acts as a space for preventing collection of soot between the two sparking points, and this non soot collecting space is relatively long compared with the length of this device as a whole.

Having described my invention I claim:

1. The combination with a casing in the form of a bushing for entering into an ignition chamber, a sparking point, a body of insulating material carrying said sparking point and of smaller radius than the radius of the inner wall of the casing, a plate of translucent material carried by said insulating material, and means for clamping said plate against the casing for affording a translucent closure for the space between the insulation and the casing.

2. The combination with a casing in the form of a bushing for application to an ignition chamber, a sparking point, an insulator carrying the sparking point and located within the bushing and leaving an annular space between its outer perimeter and the inner perimeter of the casing, and a translucent closure and connection between the insulator and the bushing.

3. The combination with a shaft, of a sparking point carried thereby, disks of mica arranged upon the shaft for insulating the same, and several of these disks at one portion being of larger radius than the normal radius of the disks at the outer portions for forming a translucent plate.

4. The combination of a body of conducting material carrying a sparking point, of an insulator upon said body of conducting material, and a plate of mica carried by said body of conducting material and extending beyond said insulating material for providing securing means for the device and for permitting observation of sparks and explosion flashes.

GEORGE J. SCHULTZ.

Witnesses:
 CHAS. LYON RUSSELL,
 FRED. J. DOLE.